United States Patent [19]
Stein

[11] Patent Number: 5,768,868
[45] Date of Patent: Jun. 23, 1998

[54] ATTACHMENT FOR GRAIN HARVESTER

[75] Inventor: Franz Stein, Harsewinkel, Germany

[73] Assignee: CLAAS KGaA, Harsewinkel, Germany

[21] Appl. No.: 694,480

[22] Filed: Aug. 7, 1996

[30] Foreign Application Priority Data

Aug. 8, 1995 [DE] Germany .................. 195 29 067.4

[51] Int. Cl.⁶ ..................................................... A01D 57/02
[52] U.S. Cl. ........................... 56/14.5; 56/16.4 R; 56/221; 56/364
[58] Field of Search .................... 56/14.3, 14.4, 56/14.5, 14.6, 126, 128, 220, 221, 364, 16.4 R

[56] References Cited

U.S. PATENT DOCUMENTS

| | | | |
|---|---|---|---|
| 3,613,336 | 10/1971 | Smith | 56/14.4 X |
| 3,628,317 | 12/1971 | Lederer | 56/14.4 X |
| 3,820,311 | 6/1974 | Sawyer et al. | 56/14.4 |
| 4,091,602 | 5/1978 | Williams et al. | 56/14.4 |
| 4,216,641 | 8/1980 | Koch et al. | 56/14.4 |
| 4,251,980 | 2/1981 | Miller | 56/14.4 |
| 4,372,103 | 2/1983 | McIlwain et al. | 56/14.4 |
| 4,407,110 | 10/1983 | McIlwain et al. | 56/14.4 |
| 5,305,586 | 4/1994 | Lundahl et al. | 56/14.4 |
| 5,433,065 | 7/1995 | Mosby | 56/14.4 X |

Primary Examiner—Michael J. Carone
Assistant Examiner—Christopher J. Novosad
Attorney, Agent, or Firm—Michael J. Striker

[57] ABSTRACT

An attachment for a grain harvester is formed as a cutting mechanism in which a hollow shaft is mounted at an end wall of a drawing-in screw located opposite to a drawing-in screw drive, and a free end of the hollow shaft carries an intermediate drive gear which is connected through a chain with an intermediate drive gear for a reel. Thereby a double drive train can be eliminated. The attachment is especially suitable for harvester threshers.

7 Claims, 3 Drawing Sheets

ATTACHMENT FOR GRAIN HARVESTER

BACKGROUND OF THE INVENTION

The present invention generally relates to an attachment for a grain harvester.

More particularly it relates to an attachment for a grain harvester, in particular a harvester thresher, which has a cutter or a receiving drum, reel and an intake or drawing-in screw which guides a drive-free adjustable shaft curved in a central region and provided with drawing-in fingers, a cutter bar releasably connected with an inclined conveyer, and a drive train which oscillatingly drives the cutter and rotatably drives the reel, and the drawing-in screw and the receiving drum. The drive train for the reel is arranged at the side which is opposite to the drive of the drawing-in screw.

In a known attachment the drives for the cutter or for a receiving drum as well as for the drawing-in screw and the reel are located at one side. The weight load produced in such a construction can be compensated without problems. Starting from a predetermined width of the attachment of approximately 5 m it is however required to distribute the one-side loading by the drive devices as uniform as possible at both sides to prevent tilting of the whole cutting mechanism. In addition to the nonuniformly increased loading, also undesirable nonuniform cutting height is produced which can be compensated only by additional lifting devices. The shaft extending through the drawing-in screw is curved in the region associated with the inclined conveyor and provided with the drawing-in fingers so as to direct the harvested product transported by the screw convolutions in direction toward the inclined conveyer. Due to the curved arrangement of the shaft it is possible to extend the free ends of the drawing fingers from the core of the drawing-in screw only when the harvested product must be deviated in a direction toward the inclined conveyer. The transporting screw is free from the screw convolutions in the region of the shaft curving.

In the known attachments the drive train is formed as a double drive train. The drive train extending from the main drive of the grain machine is branched one-sidedly, by branching from the driving one-side drive gear to parallel shafts extending at a distance from the rotatary axis of the drawing-in screw. A drive gear is mounted on the outer ends of both shafts for joint rotation, and the drive for the drawing-in screw and for the cutter or for the receiving drum extend from the drive gear located at the left as considered in the forward traveling direction. The drive gear which is located at the right in the forward traveling direction is connected with the reel drive gear. Each drive train is conventionally composed of chain gears and chains and/or belt gears and belts.

In this construction which is generally recommended the number of the required drive parts is, however, relatively great. Therefore the costs of the manufacture are correspondingly high. Moreover, the drive parts are formed as parts subjected to wear, so that after certain times they must be exchanged with corresponding high operational costs involved.

SUMMARY OF THE INVENTION

Accordingly, it is an object of the present invention to provide an attachment of the above-mentioned general type which avoids the disadvantages of the prior art.

More particularly, it is an object of the present invention to provide an attachment of the above-mention general type in which the number of required drive parts is reduced in a cost-favorable manner without negatively effecting operation.

In keeping with these objects and with others which will become apparent hereinafter, one feature of the present invention resides, briefly stated, in an attachment for a grain harvester, in which the drive gear of the reel located opposite to the drive of the drawing-in screw is coupled with an intermediate drive gear supported at the side, which intermediate drive gear is connected by a coupling element with the facing end wall of the drawing-in screw for joint rotation so that the rotary axes of the intermediate drive gear and the drawing-in screw are in alignment with one another.

By the thusly designed drive connection of the drive gear of the reel with the associated end of the rotatably driven drawing-in screw, a part of the double drive train is dispensed with, and thereby the number of the drive parts is substantially reduced. The operation of the attachment is however not negatively affected. The inventive attachment can be produced in a cost-favorable manner. It is recommended to use the drawing-in screw as a leading shaft. The additional components, in particular, the coupling element is substantially less expensive that the eliminated drive parts as a whole.

In accordance with a further embodiment of the invention, the coupling element is formed as a hollow shaft which at the side facing the drawing-in screw, is releasably connected with the end wall of a core of the drawing-in screw, and the intermediate drive gear is mounted on its opposite end region for joint rotation. The hollow shaft is a component which is simple to manufacture and can be formed for example as a cast part. For non-rotatable connection with the drawing-in screw it is advantageous when it is connected at this side with a drive flange. The connection can be performed, for example by screws in a simple manner. Advantageously, the hollow shaft overlaps the associated region of the curved shaft and is rotatably supported relative to this shaft. The support is performed for example by a roller bearing. For further reduction of the manufacturing cost it is proposed to make the intermediate drive gear and the hollow shaft as a onepiece molded component or cast component.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
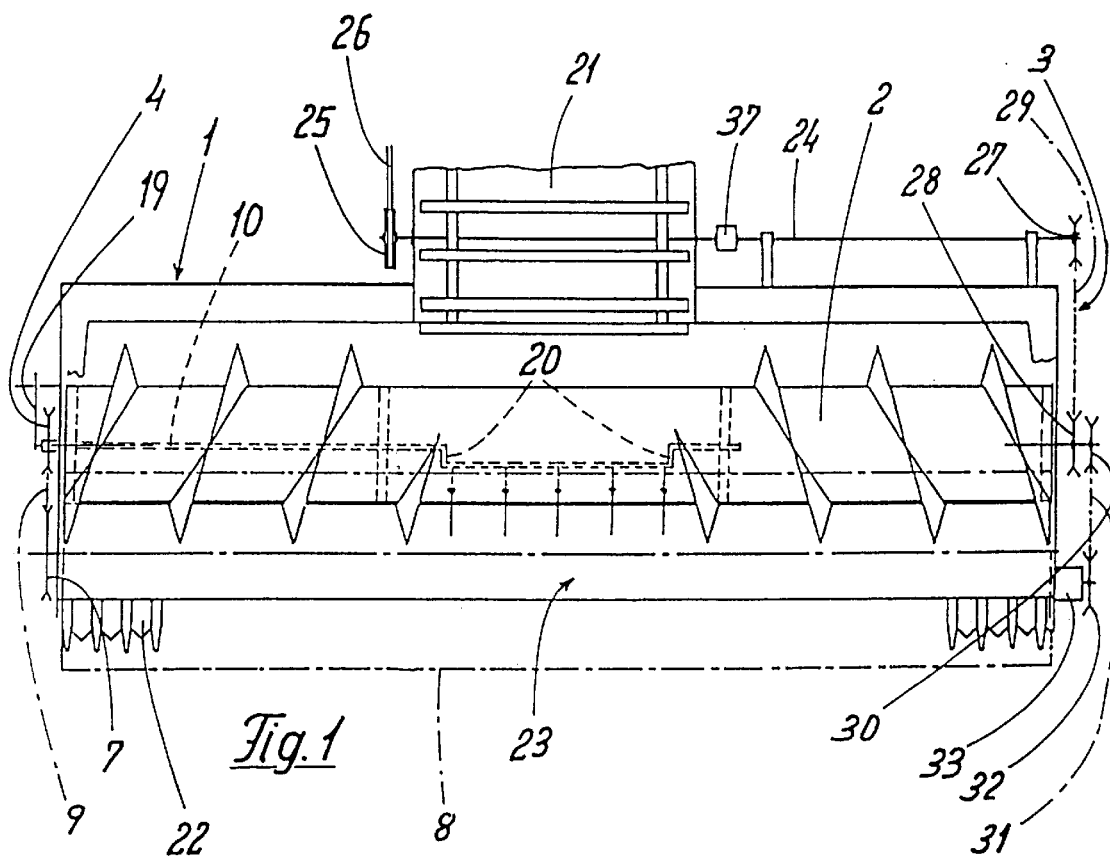
FIG. 1 is a schematic plan view of an attachment for a grain harvester in accordance with the present invention.
Figure 2:
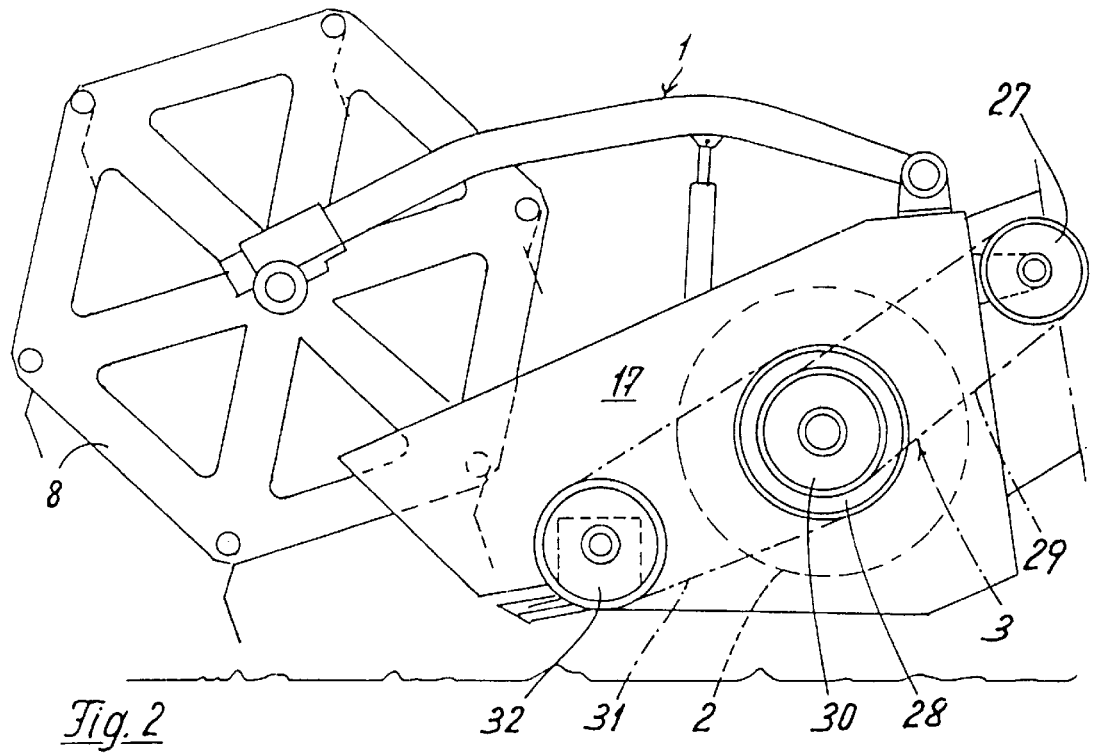
FIG. 2 is a side view of the attachment as seen from the drive, of a drawing-in screw, a cutter or a receiving drum.
Figure 3:
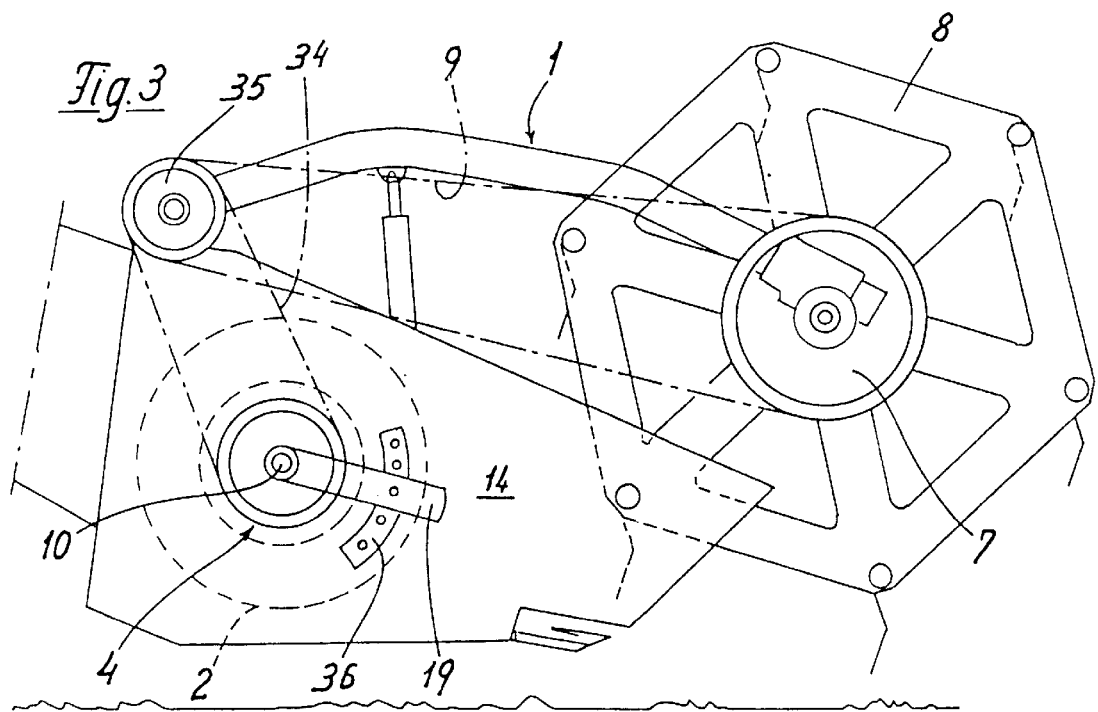
FIG. 3 is a side view of the inventive attachment as seen from a drive of a reel.

An attachment shown FIGS. 1–4 is formed as a cutting mechanism 1 which includes a drawing-in screw 2 rotatably driven by a schematically shown drawing-in screw drive 3. The drawing-in screw drive 3 in the shown embodiment is mounted at the left side as considered in a forward traveling direction. An intermediate drive gear 4 is located at the opposite right side as considered in the forward traveling direction. A hollow shaft 5 is non-rotatably mounted on a free end of the intermediate drive gear 4. The hollow shaft is provided at the opposite side with a drive flange 6 which is screwed with an end wall of the core of the drawing-in screw 2. The intermediate drive gear 4 is coupled in a driving manner with a reel drive gear 7 for driving a reel spool 8. The intermediate drive gear 4 and the reel drive gear 7 are formed as chain gears or sprockets which are connected with one another by two chains 9 and 34 and an intermediate gear 35. For simplified showing, the chain 34 and the intermediate gear 35 supported above the intermediate drive gear 4 are not shown in FIG. 1.

The non-rotatable connection of the intermediate gear drive 4 with the hollow shaft 5 for joint rotation with one another is performed in the shown embodiment by a multi-wedge toothing. In contrast to the shown embodiment, the hollow shaft 5 can be formed as a one-piece cast part with the end wall 38. A central region of the bent shaft 10 is guided through the drawing-in screw 2. The outer ends of the shaft 10 are located on the rotary axis of the drawing-in screw 2. The hollow shaft 5 surrounds the associated region of the shaft 10. The rotatable support of the hollow shaft 5 is performed by a radial deep groove ball bearing 11. Its inner ring is arranged on the shaft and its outer ring is inserted in a matching opening of the hollow shaft. For stable support of the hollow shaft 5, a further deep groove ball bearing 12 is provided. Its outer ring is held in a bearing sleeve 13 which is screwed at the outer side on the side wall 14 of the cutting mechanism 1. Thereby the drawing-in screw 2 is also supported on this side. At the to opposite side the drawing-in screw 2 is supported in a further radial deep groove ball bearing 15 which is also inserted in a bearing sleeve 16 connected with the left side wall 17 of the cutting mechanism 1.

Figure 4:
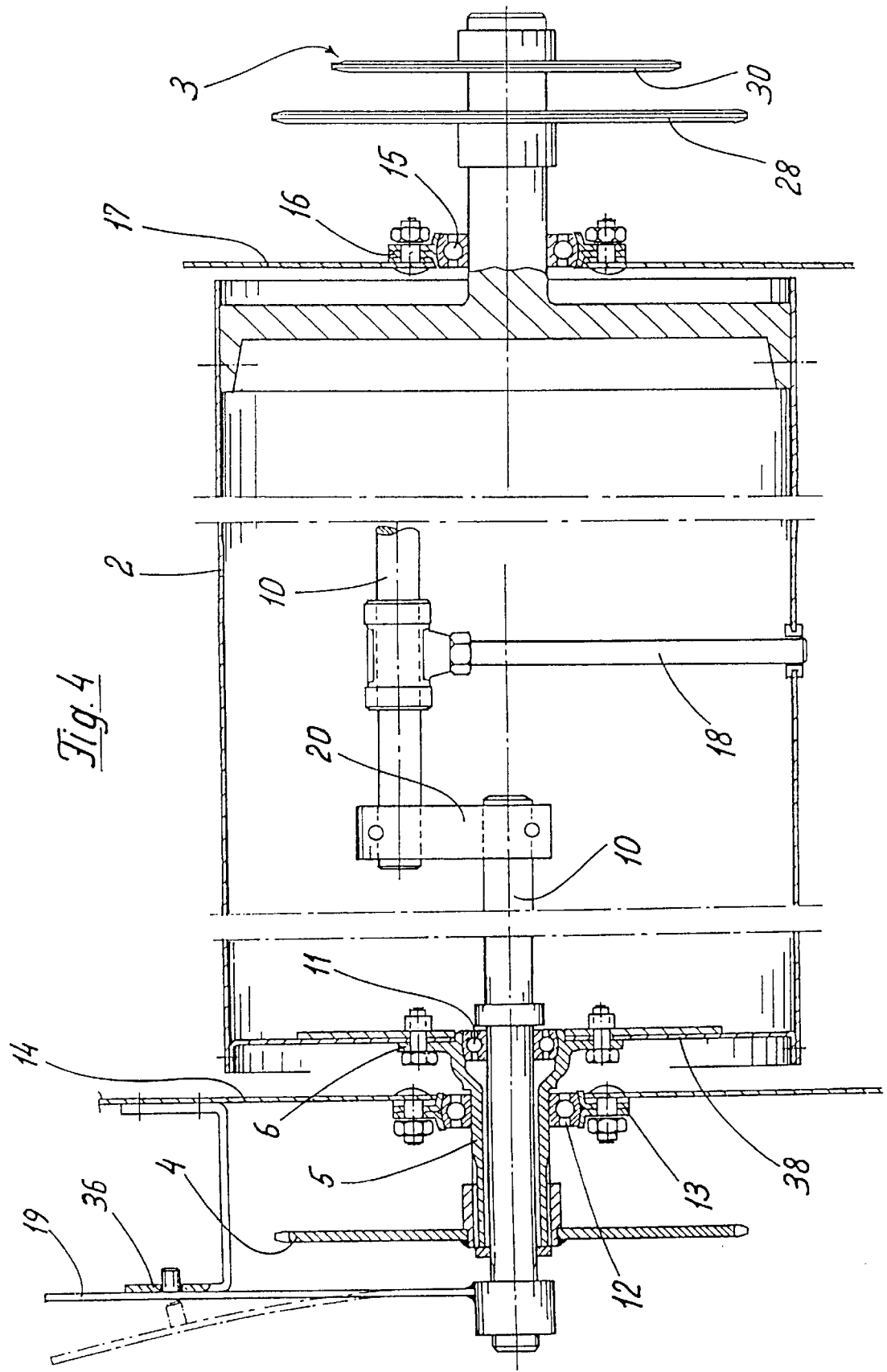
FIG. 4 is a vertical section of the drawing-in screw in a simplified embodiment, in accordance with the present invention.

For simplification of the showing, the screw convolutions of the drawing-in screw 2 are not shown in FIG. 4. The curved central region of 15 the shaft 10 is provided with several drawing-in fingers 18 which are distributed over the periphery of the drawing-in screw. An adjusting lever 19 is non-rotatably mounted on the shaft 10 at the side facing the intermediate drive gear 4. The adjusting lever 19 is provided for selectable adjustment of the shaft 10 and thereby its curvature relative to the drawing-in screw 2 and for fixing on the side wall 14 by a perforated segment 36. In operational condition of the grain harvester, the shaft 10 is immovable. For bending the shaft 10, it is composed of three portions formed so that the central portion is provided with two coupling pieces 20 in order to obtain an offset of the central portion relative to both end portions of the shaft.

The cutting mechanism 1 is also provided with an inclined conveyer 21, a cutter 22 and a cutter bar 23 releasably connected with the inclined conveyer 21. The transmission to the drive of the individual aggregate of the cutting mechanism 1 is provided through an input shaft 24 which extends parallel and at a distance from the rotary axis of the drawing-in screw 2 and guided in consoles. It is seperatable from the main drive of the grain harvester by means of a coupling 37. A drive gear 25 is non-rotatably mounted on the free end of the input shaft 24 located laterally near the inclined conveyer 21. The drive gear 25 is driven by a drive train element 26 from the main drive of the grain harvester. A drive gear 27 is non rotatably mounted on the opposite end located at the left as considered in the forward traveling direction. The drawing-in screw drive 3 is driven from the gear 27. For this purpose a further chain gear or sprocket 28 is wedged on the end of the shaft of the drawing-in screw 2 and is connected with the chain gear or sprocket 27 by a chain 29. A further chain gear or sprocket 30 is mounted laterally near the chain gear or sprocket 28 and is connected by a chain 31 with a further chain gear 32. The chain gear 32 is the drive gear for the cutter drive 33.

During the operation of the grain harvester, the driving input shaft 24 is driven by the main drive. The drawing-in screw 2 is driven by both chain gears 27 and 28. The reel drive gear 7 and the reel spool 8 are driven at opposite sides by the intermediate drive gear 4 through both chains 9 and 34 and through the intermediate gear 35. Therefore a weight distribution is obtained with saving of expensive drive strand, and thereby twisting of the inclined conveyer passage and the cutting mechanism 1 is efficiently prevented. The additional use of weight-compensating lifting devices is dispensed with since a uniform cutting height adjustment of the cutting mechanism is possible.

It will be understood that each of the elements described above, or two or more together, may also find a useful application in other types of constructions differing from the types described above.

While the invention has been illustrated and described as embodied in attachment for grain harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An attachment for a grain harvester, comprising a reel; a drawing-in screw; a drive-free shaft which has a portion provided in a central region and offset from a rest of said drive-free shaft, said drive-free shaft extending through said drawing-in screw and being provided with drawing-in fingers; an inclined conveyer provided with a releasably connected cutting means; a drawing-in screw drive and a reel drive gear arranged at a side of said cutting means which is opposite to said drawing-in screw drive, said reel drive gear being located with a lateral offset relative to said drawing-in screw drive; and an intermediate drive gear drivingly connected with said reel drive gear and connected with an associated end wall of said drawing-in screw for joint rotation with said drawing-in screw, said intermediate drive gear and said drawing-in screw having rotary axes which are in alignment with one another.

2. An attachment as defined in claim 1, and further comprising a coupling element which connects said intermediate drive gear with said end wall of said drawing-in screw.

3. An attachment as defined in claim 2, wherein said coupling element is formed as a hollow shaft which at a side facing said drawing-in screw is connected with an end wall of a core of said drawing-in screw and at an opposite end region is mounted on said intermediate drive gear for joint rotation.

4. An attachment as defined in claim 3, wherein said hollow shaft at a side facing said drawing-in screw is provided with a flange for connection with said drawing-in screw.

5. An attachment as defined in claim 4, wherein said flange of said hollow shaft forms said end wall of said core of said drawing-in screw and together with said hollow shaft is formed as a cast part.

6. An attachment as defined in claim 3, wherein said hollow shaft overlaps an associated region of said drive free shaft and is rotatably supported relative to said region.

7. An attachment as defined in claim 3, wherein said drive free shaft has an end extending through said hollow shaft and provided with an adjusting lever, said cutting means having a side wall on which said adjusting lever is fixed.

* * * * *